May 22, 1928. 1,670,571
H. HELLMANN
PROCESS OF MANUFACTURING FROM METAL, BRAKE
LININGS, GRINDING, OR FRICTION BODIES
Filed Sept. 11, 1925
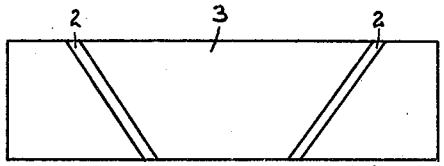
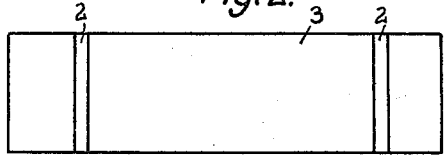
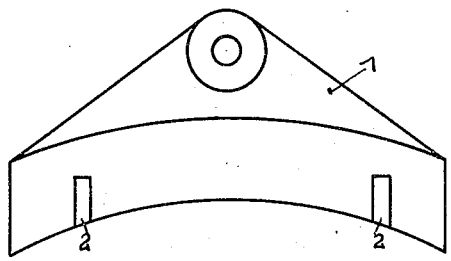
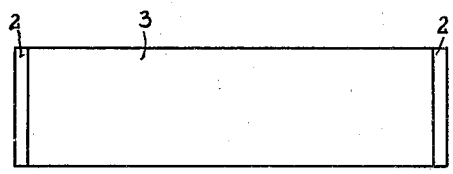
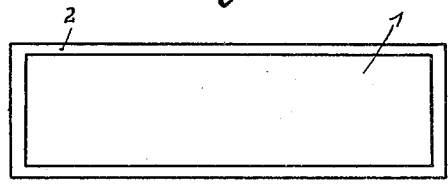
Inventor
Heinrich Hellmann
By B. Singer, Atty.

Patented May 22, 1928.

1,670,571

UNITED STATES PATENT OFFICE.

HEINRICH HELLMANN, OF BERLIN-MARIENFELDE, GERMANY.

PROCESS OF MANUFACTURING FROM METAL, BRAKE-LININGS, GRINDING OR FRICTION BODIES.

Application filed September 11, 1925, Serial No. 55,853, and in Germany April 15, 1922.

The object of the present invention is a process of improving by suitable methods of manufacture the quality and effect of braking and friction bodies of metal. Hitherto braking or frictional effects were obtained by using metal bodies, such as brake-linings, brake-blocks, friction discs, in which either the metal itself had a suitable frictional coefficient, or the metal was covered with a special material suitable for producing the required braking, frictional or grinding effect. In another known modification of braking-bodies the material with the suitable friction coefficient is let into the brake-surface, such substances being let into the brake-body either in a pliable or liquid state, the former serving, as it were, as a container or receptacle of the friction-substance. The braking-bodies hitherto known are suffering from the drawback, either that they are rapidly worn out or that the mechanically fixed friction-substance will work loose in consequence of high mechanical stress, in braking for instance, as the substances are only fixed mechanically.

The process forming the object of the present invention removes the drawbacks attaching to the braking- and friction-bodies hitherto known, in a most reliable manner by welding or fusing into the braking-bodies which may consist of the metals hitherto used, certain materials or substances by electricity or heat otherwise, such materials being welded or fused onto or into the braking-, grinding- or friction-surface in such a manner as to provide the required friction or prevent wear. In the case of brake-blocks of iron it is preferable to weld in or on harder kinds of iron or steel by means of the electric-arc welding process either in the braking-direction or at an angle to it; or the metal welded in or fused in, is run through with emery or similar material in order to obtain the required friction effect or prevent wear. These welded or fused in portions in the brake-body form one entire whole with the metal body after welding or fusing, and have, therefore, an extremely high mechanical strength and the maximum braking or friction effect together with the minimum wear; in addition, the braking- or friction-bodies manufactured from metal in this manner are cheaper than those made by the former process.

In the drawings accompanying this specification are shown several modifications of the application of the invention, and as is apparent from Figs. 1–3, bars 2 of considerable hardness may be formed from such welded-in materials in the braking surface 3 of the cast-iron brake-block 1; such welded-in portions may, however, also be of any other suitable shape. The essential feature is this, that in this case they will prevent the rapid disuse of the softer metal of the braking-body and thereby will extend the life of the brake-block.

In the modification as shown in Fig. 4 the hard bars 2 may also be arranged at the face ends or front ends, by means of the fusing or welding in process above described.

As shown in Fig. 5, the wearing surface of the brake-block or friction body may also be provided with an edge lining 2 of greater hardness than the brake-metal itself. This edge lining or protective border is preferably made in the manner described above, or the edge surfaces of the brake-block metal may be tempered themselves wholly or partly according to one of the known tempering methods, up to such a depth of the metal that a hard border of sufficient width is forming around the softer brake-block.

I claim:

1. A braking block of relatively soft metal provided with an integral portion of harder metal extending to the braking surface thereof, said portion of harder metal being provided with particles of friction creating material incorporated therein.

2. A braking block of relatively soft metal provided with an integral portion of harder metal extending to the braking surface thereof, said portion of harder metal being provided with particles of friction creating material infused therein.

In testimony whereof I affixed my signature.

HEINRICH HELLMANN.